Dec. 4, 1951 F. B. DIBBLE 2,577,652
SOUND FILM DRIVE

Filed Sept. 11, 1947 2 SHEETS—SHEET 1

Inventor
FRANK B. DIBBLE
By
Attorney

Dec. 4, 1951   F. B. DIBBLE   2,577,652
SOUND FILM DRIVE
Filed Sept. 11, 1947   2 SHEETS—SHEET 2

Inventor
FRANK B. DIBBLE
Attorney

Patented Dec. 4, 1951

2,577,652

UNITED STATES PATENT OFFICE 2,577,652

SOUND FILM DRIVE

Frank B. Dibble, Pleasantville, N. Y., assignor to General Precision Laboratory Incorporated, a corporation of New York Application September 11, 1947, Serial No. 773,340

10 Claims. (Cl. 271—2.3)

1

This invention relates to a sound film drive for motion picture film wherein the velocity of the film as it passes over the scanning drum is maintained extremely constant.

In the usual mechanism for reproducing pictures and sound from a single strip of photographic film, the film is intermittently moved at the picture projection aperture and at the same time, at a point closely adjacent thereto, the film must be moved over a scanning drum at a constant velocity so that the recorded sound may be properly reproduced.

In a similar manner, when photographic impressions representative of sound variations are recorded on a film strip, the film strip as it passes the scanning point where the variations in light intensity representative of sound variations are photographically recorded thereon, must have a constant velocity if an accurate and faithful copy of the sound waves is to be made.

Any irregularity in the velocity of the film as it passes over the scanning drum results in a fluctuation in the frequency of the sound reproduced from, or recorded on, the film causing what is known as flutter. In reproducing and recording mechanisms as they are usually constituted, various factors unite to produce irregularities in the velocity of the film as it passes the all important scanning point and if satisfactory reproduction is to be had these irregularities must be filtered out so that at the essential scanning point they are at least so reduced as not to be noticeable to the hearer.

Aside from the fluctuation in velocity due to the intermittent motion of the film for picture projection which clearly must be eliminated at the scanning point, there are such other factors as irregularities in the meshing of the film with the sprocket, irregularities in the position of the sprocket holes, irregularities in the film or the tension thereon, irregularities in the gear trains which constitute the driving means and the like.

These irregularities, it is true, are not large in well constructed mechanisms but the film itself acts as a strong spring, that is, has low compliance and such irregularities as do exist may be transmitted thru the film loop to produce pronounced fluctuations in the reproduced or recorded sound. The normal ear for example, can detect variations which are no greater than .3%.

In the past, various filter systems have been proposed which utilize resiliently mounted driving sprockets and inertia masses, but in general these systems have concentrated the filter elements at the sound pulling sprocket and have not appreciated that the mere production of a constant velocity at the sound pulling sprocket is not reflected in an equally constant velocity at the critical point, namely, the scanning drum. As previously stated, the film itself acts as a strong

2 spring and irregularities in film tension, irregularities in the meshing of the film with the sprocket and irregularities in the position of the sprocket holes in the film all act thru the spring action of the film loop between the sound pulling sprocket and the scanning drum to produce objectionable fluctuations in reproduced sound.

A purpose of the present invention therefore, is to provide an arrangement of mechanical filter elements which are so distributed throughout the system and about the essential point of sound reproduction, i. e., the scanning drum, that at this point, which is the only one of real concern, the variations in velocity are filtered out to such an extent that they are no longer apparent even to the most discriminating.

Aside from the mere provision of filter elements which when taken together will provide a system having, at the proper point, a low frequency cut-off such that fluctuations in sound reproduction that would otherwise occur are made no longer apparent, the available space into which such elements may be conveniently fitted is of material concern. This is especially true in projectors using 16 mm. film and the present invention finds particular application to such mechanisms although it is not limited thereto and may be used to advantage in projectors or recorders of any size.

Since the available space in which the filter elements is located is limited the number and size of such elements is also limited and an essential purpose of the instant invention is to provide a filter system which while having the required cutoff characteristics also incorporates only a small number of filter elements, and these of limited size.

In this invention the requirement of limited space as well as proper filter characteristics is met by the use of only three filter elements, the elements themselves being so chosen and being so placed with respect to each other and the remainder of the system, that the desired filtering action is accomplished with a minimum number of parts.

Additionally the present invention provides a filter system which avoids the use of pressure rollers, tension rollers or loop forming rollers usually used to hold the film strip in frictional engagement with the scanning drum since it has been discovered that unavoidable imperfections in such devices and the irregularity of their reaction on the film is likely to act as an additional source for the introduction of fluctuations and distortions in sound reproduction and recording.

To the end of reduction in number of elements to an irreducible minimum and the elimination of such mechanisms as are prone to introduce irregularities into the system, the present invention provides an inertia mechanism driven by the sound drum, the film being held in frictional engagement therewith by a sprocket connected to a drag or resistance located at one side of the sound drum and resiliently driven sound pulling sprocket located on the opposite side of the sound drum.

The exact nature of the invention will be more apparent from the following description when considered together with the accompanying drawings, in which.

Figure 1:
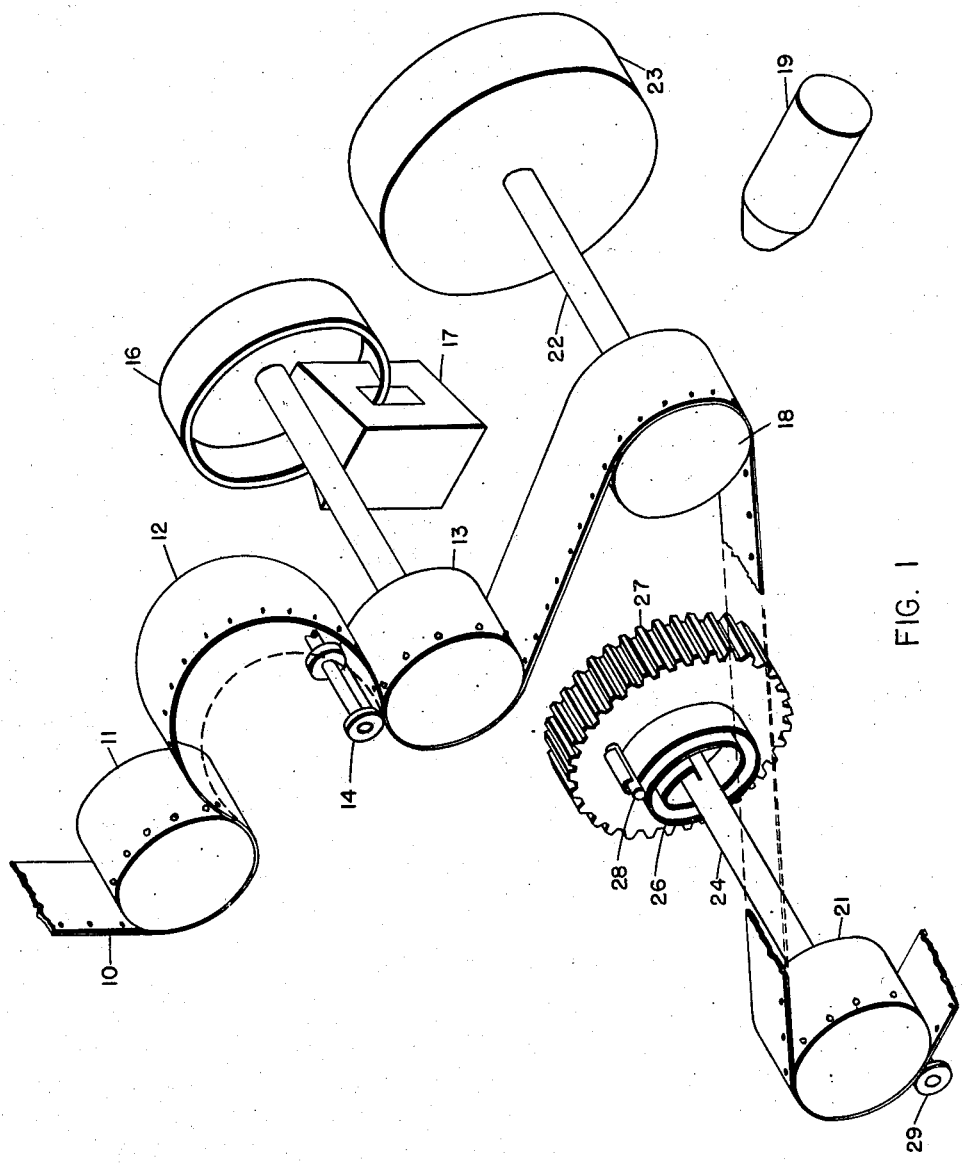
Fig. 1 is a schematic view of the essential elements of the sound film drive of the invention.

Referring to Fig. 1, the film strip 10 is pulled past a projection aperture (not shown) by an intermittent sprocket 11 driven thru suitable gearing and intermittent mechanisms which may be of any of the usual types.

After leaving the intermittent sprocket the film strip is permitted to form a free loop 12 before being engaged by a drag sprocket 13. The film strip is held in engagement with the drag sprocket 13 by a pad roller 14. A suitable resistive drag is placed on the drag sprocket 13 and hence on the film engaged thereby by a magnet drag mechanism illustrated diagrammatically by the annular cup shaped element 16 the cylindrical surface of which passes between the pole pieces of a magnet 17. It is to be understood of course, that the illustration is diagrammatic only and that any of the usual types of magnetic drags, the specific details of which form no part of this invention, may be employed.

Indeed while a magnetic drag type of mechanical resistance is deemed to be preferable, other types of mechanical resistances such as viscous drags or friction drags may be employed to advantage without departing from the spirit or scope of the invention.

Likewise other types of film engaging members such as a friction roller cooperating with a pad roller may be substituted for the sprocket 13.

After being suitably tensioned by the resistive load placed on the drag sprocket 13, and hence the film carried thereby, by the drag 16, 17, the film passes over a sound drum 18.

At this point the photographic sound record recorded on the film strip is converted to electrical variations which are subsequently amplified and reproduced as corresponding sound variations by projecting a narrow slit of light thru an optical system 19 thence thru the portion of the film strip bearing the sound record onto a photoelectric cell (not shown). The most critical point in the system, therefore, as far as constant velocity of film is concerned, is the film speed as it passes over the sound drum and it is in maintaining the velocity of the film at this one point constant regardless of what occurs in the remainder of the system, that the present invention is directed.

The film strip is held in frictional engagement by the tension applied thereto thru the medium of the drag sprocket 13 located at the approach side of scanning drum and the sound pulling sprocket 21 located on the withdrawal side of the scanning drum.

In the instant invention the use of pressure rollers, loop forming rollers or tension rollers to provide frictional wrap about the scanning drum are not used so that the fluctuations in film velocity that would otherwise be introduced by their use is avoided. Instead as aforesaid the drag sprocket and sound pulling sprocket constitute the sole means for tensioning the film about the scanning drum and for providing the frictional wrap therefor.

A shaft 22 operatively connected to the scanning drum 18 has affixed thereto an inertial mass or fly-wheel 23. The fly-wheel being coupled directly to the scanning drum operates directly on the film strip at this point thru the frictional engagement of the film with the scanning drum. As long as the film does not slip as respects the circumference of the scanning drum, the fly-wheel 23 acts to absorb and give out energy thus assisting in filtering out fluctuations in velocity of the film. This is particularly true in the case of the higher frequency fluctuations, say 24 cycles per second and above but less so in the case of the lower frequencies since to be completely effective in the low frequency ranges a fly-wheel would have to be of prohibitive size and weight.

To assist in the filtering action and particularly to aid in removing the troublesome low frequency fluctuations, i. e., in the range of 2 cycles per second, the sound pulling sprocket 21, which constitutes the sole motive force acting on the film strip as far as the sound reproduction portion of the mechanism is concerned, is driven by a resilient connection of high compliance, that is, weak spring action.

The sound pulling sprocket 21 is coupled to a shaft 24 which in turn is attached to one end of a weak coil spring 26. The other end of the coil spring 26 is fastened to a driving gear 27 by means of a pin 28 so that the shaft 24 and hence the sound pulling sprocket 21 is rotated solely thru the agency of the elastic member or spring 26.

The film 10 is held in engagement with the sprocket teeth of the sound pulling sprocket 21 by a pad roller 29 and in threading the film thru the mechanism a slight bias or tension is placed on the spring 26. This prevents the spring from oscillating about its point of zero tension in accomplishing its filtering function and prevents the introduction of irregularities in the system due to its zero set or spring hysteresis.

After leaving the sound pulling sprocket and before entering the take-up reel (not shown) a free loop of the desired size is formed in the film during the threading operation.

In Fig. 1 the resilient drive has been shown more or less in diagrammatic and simplified form as an aid in depicting the entire filter system.

Figure 2:
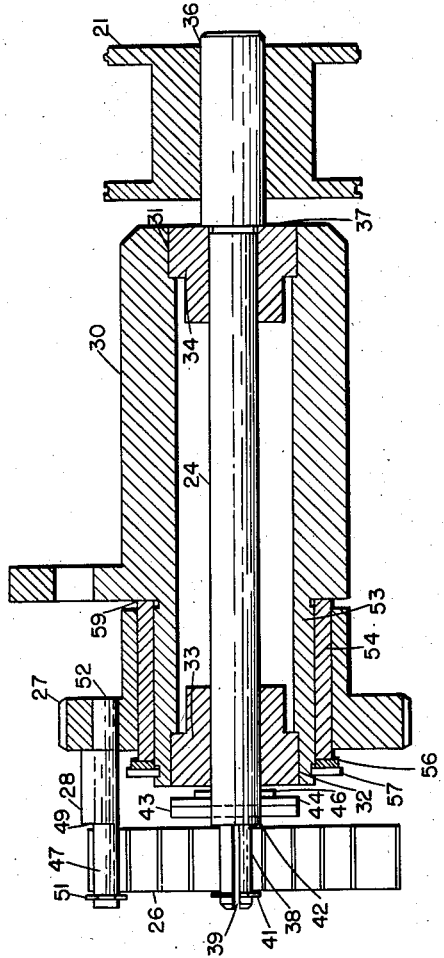
Fig. 2 is a sectional view illustrating in more detail a preferred form of resilient driving mechanism.

Fig. 2 illustrates in sectional view a preferred form of resilient driving means. Referring to this figure a housing 30 is provided at each end with enlarged annular recesses 31 and 32 into which are press fitted sleeve bearings 33 and 34. Shaft 24 is journalled in these bearings and at one end is provided with an enlarged portion to which is fastened the sound pulling sprocket 21. A shoulder 37 formed by the juncture of the enlarged portion 36 and the remainder of the shaft 24 abuts against the face of bearing 34 acting as a thrust bearing for the shaft 24.

The other end of shaft 24 is provided with a reduced portion 38, bifurcated by the slot 39. The spiral spring 26 has its inner end fastened to the reduced portion 38 by insertion in the slot 39 and is retained against lateral movement by the coaction of a spring ring 41 carried in an annular groove in shaft 24 and a shoulder 42 formed by the juncture of the reduced portion 38 and the remainder of the shaft 24.

A pin 43 driven thru the shaft 24 and cooperating with thrust washers 44 and 46 limits the lateral movement of the shaft 24 to a desired minimum, a certain end play of .002 to .003 inch being found to be desirable.

The outer end of spiral spring 26 is fastened to a reduced portion 47 of a pin 28 by being partially wrapped around the portion 47 and restrained from lateral movement by the cooperation of shoulder 49 and spring ring 51 retained in an annular groove formed in pin 28.

The other end of pin 28 is likewise provided with a reduced portion 52 rigidly attached to the driving gear 27 by means of a driven fit. The gear 27 is connected to the source of motive power thru suitable gearing (not shown) and is mounted to rotate about a reduced portion 53 formed on the housing 30. A sleeve bearing 54 is connected to the gear 27 by a press fit and rotates with the gear, the bearing surface being provided by portion 53 of the housing 30 and the cooperating surface of bearing 54. Lateral movement is prevented by a thrust washer 56 and a spring ring 57 fitting into an annular groove 58 which cooperate with the bearing 54 and shoulder 59 on the housing 30 to retain the bearing in proper lateral position.

Figure 3:
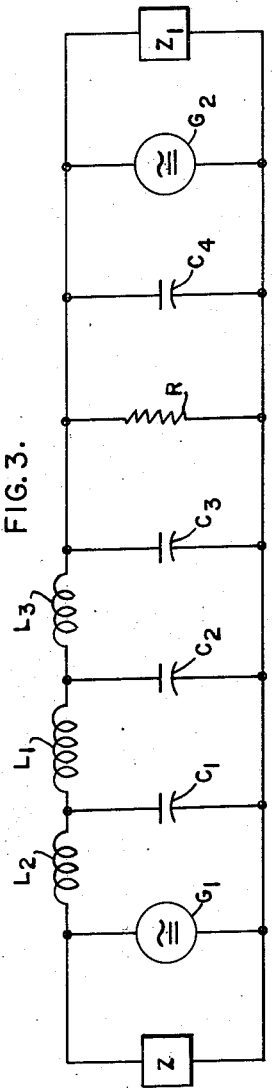
Fig. 3 is an equivalent electrical circuit illustrating the characteristics of the filter system of the invention.

As an aid in understanding the operational characteristics of the filter system of this invention reference is made to Fig. 3 wherein there is illustrated in schematic form and by the use of electrical analogy the filter of the instant invention. As is well understood in the art, mechanical filter elements operate in a manner similar to electrical filter elements wherein mechanical torque is equivalent to impressed voltage, velocity is equivalent to current, inertia equivalent to inductance, the reciprocal of spring constant, that is, the compliance thereof is equivalent to capacity and mechanical resistance equivalent to electrical resistance.

Considering first the filter system as it operates to smooth out variations introduced into the system looking from the sound pulling sprocket end. The film pulling means may be considered as a generator $G_1$ having an internal impedance Z which generator produces a direct current, constituting the uniform velocity desired, superimposed on which is an alternating current having various frequency component corresponding to the frequencies of the various irregularities, and fluctuations in velocity of film travel which must be filtered out if satisfactory operation is to be had allowing only the direct current component, i. e., uniform film velocity to be transmitted through the system.

The condenser $C_1$ connected in parallel to the generator $G_1$ is representative of the spring 26 and inasmuch as this spring has high compliance, that is, is a weak spring $C_1$ by analogy is of considerable capacitance and hence offers low impedance to fluctuating currents acting to bypass them before they reach the remainder of the system. How much of the fluctuating currents are bypassed and how low in frequency are the currents which are sufficiently bypassed, that is to say, the low frequency cutoff of the filter depends not only on the size of the condenser $C_1$ and hence its admittance to currents of low frequencies but also on the impedance of the remainder of the circuit relative thereto, this relationship being expressed by the quantity $$\sqrt{\frac{1}{LC}}$$

where L is the inductance of the circuit and C its capacitance.

There is a limit to the size that condenser $C_1$ can be made, that is, the amount of compliance of spring 26 and still permit practical operation, hence for good low frequency cutoff characteristics considerable inductance or in mechanical terms inertia should be introduced into the system. There is of course, also a limit to the amount of inertia that may be used in a practical system but by the use of both elements properly associated and distributed in the system of this invention, the desired results are obtained.

In the diagram of Fig. 3 the inertia is represented by its electrical analogy of the inductance $L_1$ and it is to be particularly noted that this element is placed at the critical point in the system, namely, the scanning drum.

If only inductance and capacitance are utilized in a filter network resonant conditions are likely to obtain at an undesirable frequency and hence to avoid such undesirable conditions the instant invention provides a damping means for the filter network consisting of the resistance R, the mechanical elements corresponding thereto as used in the invention being the mechanical resistance on drag 16 and 17 of Fig. 1.

For the sake of completeness there is also depicted in Fig. 3 the inductances $L_2$ and $L_3$ and capacities $C_2$ and $C_3$ which while not filter elements consciously added to the system, represent the small inertias and compliances of elements necessarily present in a system such as this. The inductance $L_2$ for example, illustrates the inertia of the sound pulling sprocket 21, the capacity $C_2$ the compliance or stiff spring action of the portion of the film between the sound pulling sprocket 21 and scanning drum 18, the capacity $C_3$ the spring action of the portion of the film between the scanning drum 18 and the drag sprocket 13 and the inductance $L_3$ the inertia of the drag sprocket 13. The value of all of these elements is quite small and contribute little to the desired filtering action As far as the fluctuations generated at the sound pulling end of the system are concerned, the filtering action is obtained by the addition of but three elements all of reasonable practical size so evenly distributed about the essential scanning point that at this critical location fluctuations are reduced below the desirable level. By distributing the filter elements around the critical location the likelihood of fluctuations being introduced at one point in the system after having been filtered out at another is avoided and additionally the filter elements themselves may be used as the means for obtaining frictional wrap around the scanning drum thus eliminating the need of other devices to perform this function which devices themselves are likely to act as generators of undesirable fluctuations.

Considering now the filter from the other end of the system, namely, the intermittent side thereof, it is apparent that the intermittent acts as a generator of disturbances and this has been represented on the diagram of Fig. 3 as a generator $G_2$ having an internal impedance $Z_1$ which like the generator $G_1$ produces a direct current on which is superimposed an alternating current of various undesired frequency components.

These fluctuations must also be filtered out so that they are not present at the scanning location if good results are to be obtained and to this end a free loop 12 (see Fig. 1) is formed in the film strip after it leaves the intermittent 11 which is permitted to pulsate as indicated by the dotted lines in accordance with the intermittent movement of the film strip at this point. Since the loop is free it is under inconsiderable tension and hence has high compliance or weak spring action. This loop may therefore be represented as a large capacity as is indicated at $C_4$ of Fig. 3. This capacity taken together with inductance $L_1$, the fly-wheel inertia, acts as a low cutoff filter in the same manner as does the capacity $C_1$ and inductance $L_1$ so that a nicely balanced filter is obtained which prevents disturbances from reaching the critical or mid point of the system regardless of which end they may be introduced.

What is claimed is:

1. In a film driving mechanism, a sound pulling sprocket for moving a strip of film past a scanning point, a driving gear for said sound pulling sprocket, a weak spiral spring having one end connected to said driving gear and its other end connected to said sound pulling sprocket, a scanning drum at said scanning point driven by said film strip, a single mass of considerable inertia attached to and rotated by said scanning drum and drag means for resisting the movement of said film strip and cooperating with said sound pulling sprocket for placing said film strip under tension and for causing said film strip to frictionally engage said scanning drum.

2. A film driving mechanism in accordance with claim 1 in which the means for resisting the movement of the film strip and the sound pulling sprocket constitute the sole means for causing the film strip to frictionally engage the scanning drum.

3. In a film driving mechanism, a sound pulling sprocket constituting the sole means for moving a strip of film past a scanning point, driving means including a driving gear for said sound pulling sprocket, a spring connected to said driving gear and said sound pulling sprocket and forming a resilient driving connection therebetween, a scanning drum at said scanning point driven by frictional engagement of said film strip, a single mass of considerable inertia attached to and rotated by said scanning drum and drag means located on the side of said scanning drum remote from said sound pulling sprocket and cooperating therewith for placing said film strip under tension.

4. A film driving mechanism in accordance with claim 3 in which the drag means cooperates with the sound pulling sprocket to constitute the sole means for causing the film strip to frictionally engage the scanning drum.

5. A film driving mechanism in accordance with claim 3 in which said drag means comprises a film engaging roller having a magnetic drag operatively connected thereto.

6. A filter for a film driving mechanism comprising an intermittent driving mechanism for intermittently advancing a film strip, a scanning drum rotated by said film strip, a single inertial mass attached to and rotated by said scanning drum, drag means interposed between said intermittent driving mechanism and said scanning drum for applying tension to the portion of said film strip existing between said drag means and said scanning drum and for forming an untensioned loop in the portion of the film strip existing between said intermittent driving mechanism and said drag means, a sound pulling sprocket constituting the sole means for moving said film past said scanning drum disposed on the side of said scanning drum remote from said drag means, a driving gear therefor and a high compliance spring interconnecting said driving gear and said sound pulling sprocket forming a resilient connection for driving said sound pulling sprocket.

7. A filter for a film driving mechanism in accordance with claim 6 in which said drag means and said sound pulling sprocket cooperate to constitute the sole means for causing the film strip to frictionally engage the scanning drum.

8. A filter for a film driving mechanism comprising an intermittent driving mechanism for intermittently advancing a film strip, a scanning drum rotated by said film strip, a single inertial mass attached to and rotated by said scanning drum, a sprocket interposed between said scanning drum and said intermittent driving mechanism, a drag operatively attached to said sprocket whereby tension is applied to the portion of the film strip existing between said scanning drum and said sprocket and a fluctuating loop of inconsiderable tension is formed between said intermittent driving mechanism and said sprocket, a resilient driving means disposed on the side of said scanning drum remote from said sprocket and drag constituting the sole means for advancing said film strip over said scanning drum and comprising a sound pulling sprocket, a driving gear therefor and a spring connected to said driving gear and said sound pulling sprocket.

9. A filter for a film driving mechanism in accordance with claim 8 in which said sprocket and drag and said resilient driving means cooperate to constitute the sole means for causing the film strip to frictionally engage the scanning drum.

10. A filter for a film driving mechanism in accordance with claim 8 in which the spring connected between said driving gear and said sound pulling sprocket is placed under an initial tension such that fluctuations introduced by the film driving mechanism cause the spring to oscillate about such a point other than its point of zero tension that said spring is never permitted to pass thru its point of zero tension.

FRANK B. DIBBLE.

REFERENCES CITED

The following references are of record in the file of this patent:

UNITED STATES PATENTS

| Number | Name | Date |
|---|---|---|
| Re. 20,621 | Vogt | Jan. 11, 1938 |
| 1,909,074 | Reynolds | May 16, 1933 |
| 1,962,367 | Smythe | June 12, 1934 |
| 1,963,562 | Shaw | June 19, 1934 |
| 1,985,030 | Hanna | Dec. 18, 1934 |
| 2,031,756 | Boecking | Feb. 25, 1936 |
| 2,092,064 | Hanna | Sept. 7, 1937 |
| 2,099,376 | Shapiro | Nov. 16, 1937 |
| 2,108,337 | Hoffman | Feb. 15, 1938 |
| 2,248,106 | McNabb | July 8, 1941 |